W. H. HAWS.
PROCESS AND MACHINE FOR MAKING BRICKS.
APPLICATION FILED JULY 29, 1920.
1,425,010.
Patented Aug. 8, 1922.
2 SHEETS—SHEET 2.
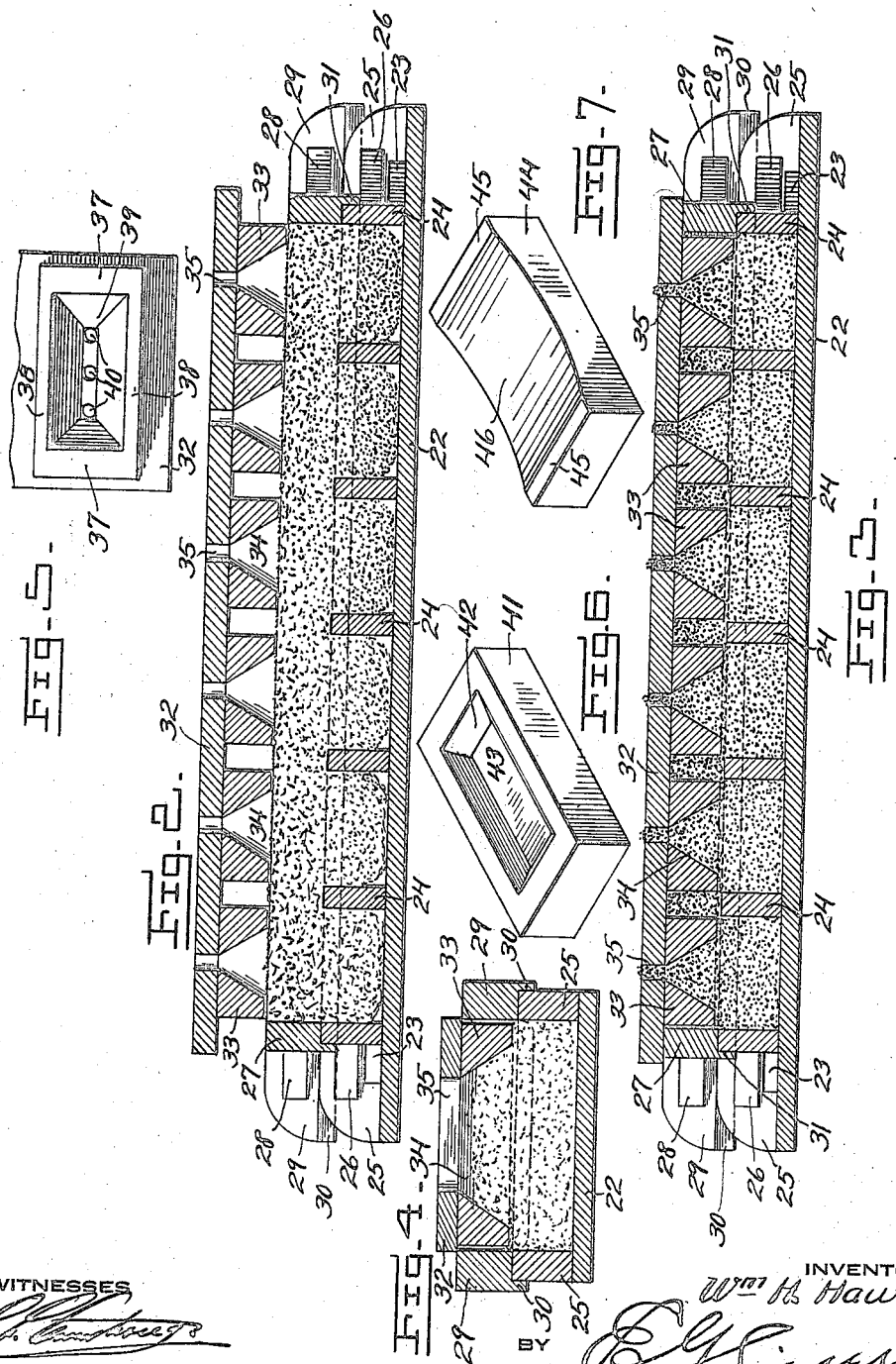
WITNESSES
INVENTOR
Wm H. Haws
BY
ATTORNEYS

UNITED STATES PATENT OFFICE.

WILLIAM H. HAWS, OF JOHNSTOWN, PENNSYLVANIA, ASSIGNOR OF ONE-FOURTH TO HENRY Y. HAWS, OF JOHNSTOWN, PENNSYLVANIA, AND ONE-FOURTH TO DAVID BARRY, OF JOHNSTOWN, PENNSYLVANIA.

PROCESS AND MACHINE FOR MAKING BRICKS.

1,425,010.  Specification of Letters Patent.  Patented Aug. 8, 1922.

Application filed July 29, 1920. Serial No. 399,742.

*To all whom it may concern:*

Be it known that I, WILLIAM H. HAWS, a citizen of the United States, residing at Johnstown, in the county of Cambria and State of Pennsylvania, have invented a new and useful Process and Machine for Making Bricks, of which the following is a specification.

This invention relates to brick molding machines.

In manufacturing brick from silica and similar materials, problems are encountered very different from the problems which must be solved in the manufacture of brick clay. Ordinarily clay, when compressed in a mold, will spread sidewise. In other words, clay will yield laterally to downward pressure, thus filling a mold with the result that the bricks so molded have sharp and continuous corners. When working with silica or the like, the action of the raw material under pressure is entirely different. Silica, when compressed in a mold by a plunger operating from above, will not spread laterally to fill the corners of the mold; hence silica bricks, in spite of their many advantages, have long been noted for their unevenness, bricks formed in the same operation varying in density and in dimensions and frequently having rough or uneven corners. Now silica, chrome and magnesite bricks have their greatest utility perhaps in the manufacture of furnaces of different kinds. If bricks of these materials can be made with uniform density and dimensions, it would be possible to build furnaces having tighter joints and therefore having a cosiderably longer life.

The general object of the invention is to provide a machine which will produce brick of absolutely uniform dimensions, weight and density, even when manufacturing silica, chrome or magnesite, or similar brick.

In practical brick making, it is well known that there is no weighing or measuring device which will deliver brick material into the mold to produce unform dimensions in the finished product. The only way for the finished product to be uniform is to first provide a surplus of material, then compress the material in the mold while providing means for the surplus to get away from the mold. It is a further object of this invention to provide a compressor having blocks so shaped that the surplus material goes to the center of the blocks and is not compressed but is heaped up in the form of a mound on the mold.

A further specific object of the invention is to provide a retainer adapted to be placed on top of the mold so as to hold a large surplus of material over the top of the mold prior to the pressing of the material within the mold to prevent the material from being spattered about when the compressor is driven down into the mold.

A still further object is to provide means for clamping the mold upon the machine during the compressing operation.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 2 is a longitudinal cross section through the compressor, retainer, the mold and the brand plate, prior to the compressing operation.

Fig. 3 is a similar view showing the position of the parts after the compressor has been driven down to its full extent.

Fig. 4 is a transverse cross section through the parts shown in Fig. 3.

Fig. 5 is a perspective view of a modified form of block which may be used on the compressor.

Fig. 6 is a perspective view of a second modified form of block.

Fig. 7 is a perspective view of a third modified form of block.

Figure 1:
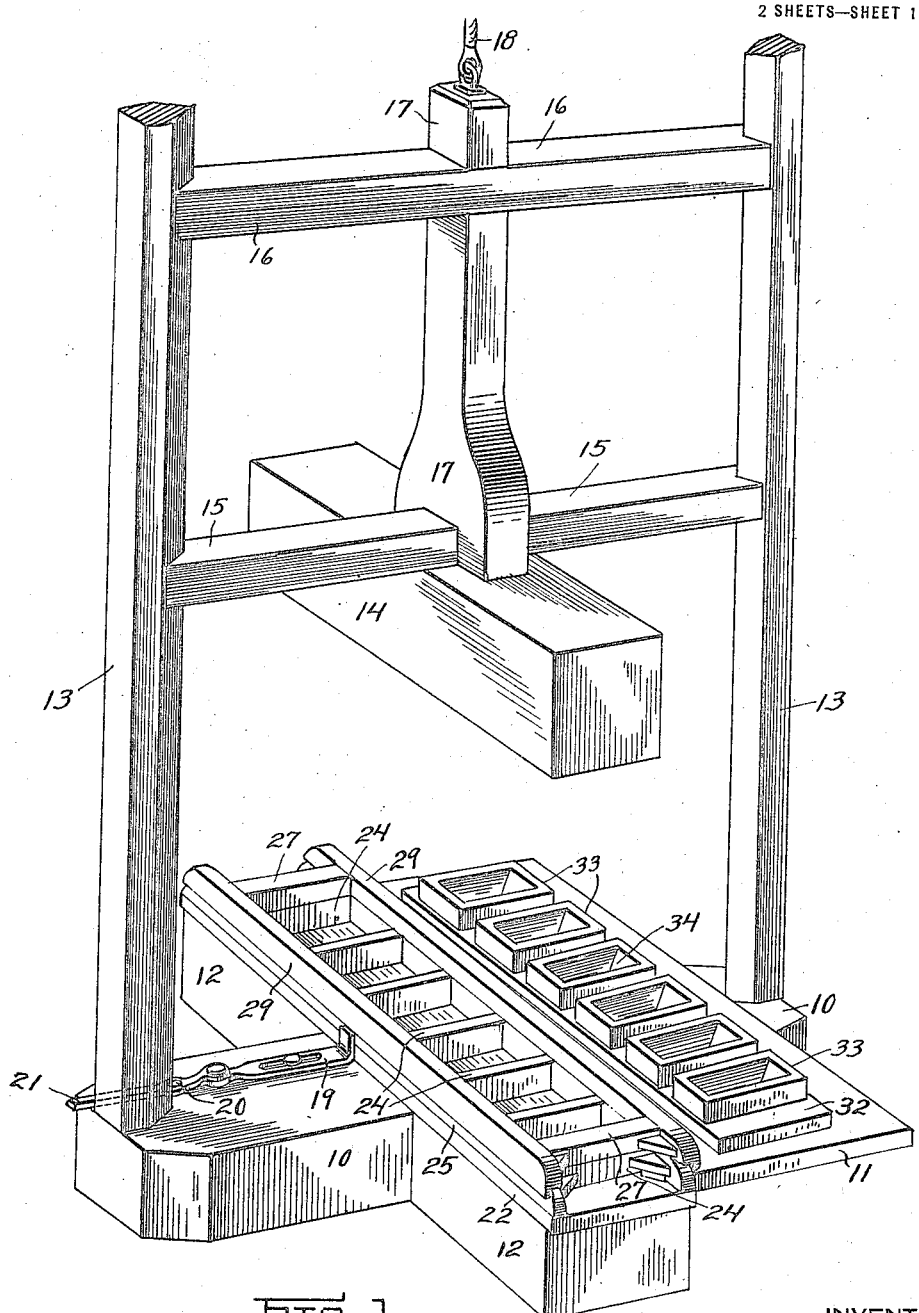
Fig. 1 is a perspective view of a simple form of brick molding machine showing the retainer in position upon the mold and the compressor removed therefrom.

The numeral 10 designates the base of the brick molding machine, which base has a transversely-extending platform 11 designed to receive the compressor after it has been removed from within the retainer following the compressing operation. 12 designates an extension of the base 10, which extension has its upper face flush with the top of the base 10 but below the upper side of the platform 11. The extension 12 extends crosswise of the base 10 and must have a length at least equal to the mold, since it provides a support upon which the mold is held during the pressing of the material.

Rising from the base 10 is a pair of standards or guides 13 in spaced parallel relation. A striker block or hammer 14 is secured to the lower end of a bar 17 in turn joined to a plurality of cross pieces 15, 16 which slide along the guide 13. The upper end of the bar 17 is connected to any power means whereby the bar and hence the hammer block may be raised and lowered. In Fig. 1 a cable 18 is shown connected to the upper end of the bar 17, but this showing is merely illustrative, and instead a steam driven piston or the like may be directly connected to the bar 17.

Upon the base 10 at one side of the extension 12, a clamp is provided of any convenient construction. A simple form of clamp is illustrated in Fig. 1 and comprises a sliding member 19 with an upturned flange or lip adapted to be pressed against the side of the mold and brand plate. This member 19 is pivotally connected at its other end with a lever 21 pivotally mounted by an element 20 upon the base. Thus a toggle clamp is provided and the lever 21, when swung in one direction, will pull the member 19 away from the brand plate and mold, while when moved in the other direction, will press these two members against the side of the platform 11, which, it will be remembered, rises above the base 10. It is necessary that some means for clamping the mold be provided so that under the heavy hammer blows from the block 14 during the compressing operation the mold will not be moved along the base.

As is customary in manufacturing brick, the present apparatus employs a brand plate 22 which has brands provided at suitable intervals, so that each brick molded by the apparatus will have the desired insignia formed upon one face of the same. The brand plate forms the bottom of the mold during the compressing operation, as is indicated in the drawing, the mold being placed over the brand plate and held against lateral movement by engagement with a plurality of knobs 23. These knobs fit the inside of the mold and effectively prevent any shifting either laterally or longitudinally of the mold along the brand plate.

The mold here employed is of common construction, comprising a plurality of rectangular compartments each adapted to receive material enough to form a single brick. Partitions 24 are joined at their ends to side walls 25 running longitudinally of the mold, each partition 24 having a width equal to that of the side wall 25. The mold may be of any size to form any desired number of bricks having any desired shape. The showing of the drawing is merely illustrative in these particulars. Neither the mold nor the brand plate form any part of the present invention.

The mold has a pair of webs 26 at each end for strengthening the outermost partition 24 and its connection with the side plate 25.

A rectangular frame-like member, hereafter referred to as the retainer, is provided so as to hold a surplus of the brick material above the mold prior to the compressing operation. This retainer comprises a pair of cross pieces 27 and sides 29 joined by webs 28 similar to the webs 26. The cross pieces 27 are short of the ends of the sides 29, as shown, and are designed to seat upon the upper edges of the endmost partitions 24, the lower edges of the cross pieces 27 being rabbeted as indicated at 31 for this purpose. The sides 29 are also rabbeted as indicated at 30 and rest upon the upper edges of the side plates 25 of the mold, as shown in Fig. 4. Thus the retainer fits over the mold and is held securely thereon against both longitudinal and transverse movement. The retainer has a height fully equal to that of the mold so that approximately twice as much brick material may be heaped upon the mold as the mold itself will hold with the material packed loosely.

The compressor, which forms a principal part of the present invention, comprises a flat plate 32 having a plurality of spaced rectangular die blocks 33 secured to one side or face thereof. In Figs. 2, 3 and 4, these die blocks are shown as having trough-like cavities or cutaway portions 34 extending entirely through the thickness of the blocks and narrowest at the upper ends of the blocks or where the blocks join the plate 32. Expressed in other terms, these cutaway portions of the blocks are frusto-pyramidal in form. The plate 32 has slots 35 extending transversely of the plate, there being one slot 35 for each block 33 and the openings 34 of the blocks joining with the slots 25. Each cavity 34 is narrower at the bottom than the width of the block so as to provide a flat pressing face all around the periphery of the block.

In Fig. 5, a modified form of block 36 is shown, wherein the transverse base edge 37 is approximately twice as thick as the longitudinal edge 38. A cutaway portion 39 is provided similar to the portion 34, but in this construction the plate 32ª has a series of perforations 40 in place of the slots 35. In Fig. 6, a second modified form of block 41 is shown having a depression 42 terminating in a bottom 43 which is rectangular and closes the depression. In this form, no slots or perforations in the block supporting plate will be provided. In Fig. 7, a further form of blocks is depicted, wherein the block 44 has straight base edges 45 and a depression 46 concaved longitudinally of the block.

The method of making brick from the apparatus which has been described will now be outlined. First, the mold is laid over the brand plate and the retainer seated upon the mold. Then the silica or other brick-forming material is heaped into the mold and retainer until it is level with the top of the retainer. Next, the compressor is laid in the position illustrated in Fig. 2, so that it rests upon the material within the retainer. Then the base of the machine will then be dropped upon the upper side of the compressor the necessary plurality of times until the blocks of the compressor assume the position illustrated in Fig. 3 with the under side of the plate 32 coming in contact with the upper edges of the retainer. The compressor will now be removed and may be laid in position illustrated in Fig. 1. As there is no pressure on the material which enters the cavities, the compressor allows the material to remain in the loose state just as it was in the retainer previous to the pressure being put thereon, and when the retainer and compressor are removed the material which was in the cavities remains heaped up in the form of a mound on the mold. The retainer will now be removed. Then the hammer will be dropped again so as to beat down evenly the material remaining on the top of the mold after the withdrawal of the compressor. The clamp on the edge of the machine will then be manipulated to release the mold when it will be pushed forward from its position under the hammer, allowing another mold to take its position. The mold which has been pushed from under the hammer will be received by the workmen, who will, with a tool used for the purpose, sweep the remaining surplus material even with the top edge of the mold. The mold will be reversed so as to rest upon a pallet and the brand plate will be removed. Then a push board will be pressed down into the mold so as to cause each brick to fall out of the mold and rest upon the pallet. The bricks will now be taken to the drying ovens and when thoroughly dried taken to the kilns to be burned. There will be at least six complete sets employed, each composed of one brand plate, one mold, one retainer, one compressor, so that when the hammer has completed its operation, other sets are ready to take the place of the one under the hammer. Then the same process is gone through as before, and by this means the hammers are kept busily engaged.

In the patent obtained by me Nov. 12, 1918, No. 1,284,670, a brick molding machine is described having a compressing cap plate 18 which forces silica into a mold 20. It has been found that because of the peculiarity of silica as outlined in the forewards of the present specification, that however great the pressure exerted by the cap plate 18 the silica will not be compressed to more than a certain extent within the mold 20. The upper edges of the partitions of the mold receive most of the thrust from the cap plate 18 and prevent an increase of pressure on the part of the latter from producing a corresponding increase in density in the bricks formed by the mold. The present apparatus gets away from this difficulty by spacing the blocks of the compressor apart a distance somewhat greater than the thickness of the partitions 24 of the mold. Each block exerts all of its pressure directly downwardly on the silica and no pressure whatever upon the upper edges of the mold partitions. The bases of the blocks are rectangular and the cavities of the blocks are central thereof so that the greatest pressure upon the silica is exerted where the corners of the brick are formed. Thus the driving downward of the compressor causes the silica to fill the molds completely and continued downward movement of the compressor makes the silica in the interior of the brick compact. The surplus silica is received within the cavities of the blocks and if there be a large enough surplus, it will pass out through the slots 35 or perforations 40. The peculiar shape of cavities 34, 39, 42 is designed especially for work with such brick-forming material as silica which does not flow laterally under pressure from above but is compressed only in the lines of the pressure.

While the compressor has been shown as an element distinct from the hammer, its plate 32 may be secured to the under side of the hammer block 14, and if the mold is in proper position upon the base of the machine, the blocks of the compressor will be driven down through the retainer without exerting any pressure whatever upon the upper edges of the partitions of the mold. It will be noted that the thickness of the blocks of the compressor is somewhat less than the depth of the retainer when seated on the mold so that when the compressor is driven into the retainer to its fullest extent, the lower sides of the blocks will be spaced a short distance above the upper side of the mold. This is clearly indicated in Fig. 3.

What is claimed is:—

1. In molding apparatus, the combination with a mold, of means for compressing the material within the mold, said means including a die block having a cavity in its pressing face, and an opening in the die block communicating with the top of said cavity for the discharge of excess material from the cavity.

2. In molding apparatus, the combination with a mold, of a retainer for holding excess material at the top of the mold, said retainer having a height substantially equal to the mold, and means for supporting the retainer on the mold and interlocking the same therewith so as to hold the retainer from lateral and longitudinal movement.

3. In molding apparatus, the combination with a mold, of a retainer for holding excess material at the top of the mold, and a compressor having die blocks which are of a depth less than the depth of the retainer, said die blocks entering the retainer and compressing the material therein, whereby when fully compressed, the lower ends of the die blocks terminate short of the upper face of the mold.

4. In molding apparatus, the combination with a mold having partitions forming a plurality of compartments, of a compressor having a plurality of die blocks corresponding in number to the compartments, said die blocks being spaced apart a distance greater than the thickness of said partitions, and a retaining means for excess material interposed between the mold and the compressor and supporting the compressor above the mold, whereby pressure on the upper edges of the mold partitions is relieved and the die blocks do not enter the compartments of the mold.

5. In molding apparatus, the combination with a mold, of means for compressing the material within the mold, said means including a die block, and means for holding an excess of material upon the mold, said means admitting movement of said die block into or out of the same, but restraining the compressing means from entering the mold.

6. In molding apparatus, the combination with a mold having a compartment, means for holding an excess of material upon the mold and above the compartment, of means for compressing the material within the mold compartment including a die block, said die block being so shaped as to compress the material near the walls of the compartment with greater force than the material removed from said walls.

7. In molding apparatus, the combination with a mold having a compartment, of means for compressing the material within the mold compartment including a die block, said die block being so shaped as to compress the material near the walls of the compartment with greater force than the material removed from said walls, and means for holding an excess of material upon the mold, said means admitting said die block but preventing movement of the die block therein far enough to enter the mold.

8. In molding apparatus, the combination with a mold, of means for compressing the material within the mold including a die block, and means to retain an excess of material upon the mold, said retaining means admitting said die block, the die block being adapted to compress material held within the mold, said die block having a cavity so shaped that upon the removal of the die block a heap or mound of excess material is left on top of the mold with the material in the heap loose or not compressed.

9. In molding apparatus, the combination with a mold, of means for compressing the material within the mold including a die block, and means to retain an excess of material upon the mold, said retaining means admitting said die block, the die block being adapted to compress material held within the mold, said die block having a cavity so constructed that during the compressing operation some of the excess material may pass entirely through the die block and some of the excess material will be received within the die block and left on top of the mold when the compressor is removed.

10. In molding apparatus, the combination with a mold, retaining means for excess material fitting upon and supported by the mold, the interior dimensions of said means being substantially those of the mold whereby material in the retainer may be passed without resistance into the mold, and a compressor adapted to be received within the retainer and having means to engage the same to stop the compressor short of the mold.

11. In molding apparatus, the combination with a mold, of a retainer for excess material fitting upon and supported by the mold, said mold having a plurality of compartments, a compressor having a plurality of die blocks each of a size so that it can be passed into a compartment, the die blocks being spaced apart, and the retainer comprising an open frame freely admitting the die blocks and allowing material to pass into the spaces between the blocks.

12. In molding apparatus, the combination with a mold, of a retainer for excess material fitting upon and supported by the mold, said mold having a plurality of compartments, a compressor having a plurality of die blocks each of a size so that it can be passed into a compartment, the die blocks being spaced apart, and means whereby the compressor engages with the retainer before its die blocks can enter the mold to prevent further movement thereof.

13. In molding apparatus, the combination with a mold, of a retainer for excess material fitting upon and supported by the mold, said mold having a plurality of compartments, a compressor having a plurality of die blocks each of a size so that it can be passed into a compartment, the die blocks being spaced apart, each of said die blocks having a cavity provided on the compressing face thereof, and the retainer comprising an open frame freely admitting the die blocks and allowing material to pass into the spaces between the blocks.

14. In molding apparatus, the combination with a mold, of a retainer for excess material fitting upon and supported by the mold, said mold having a plurality of compartments, a compressor having a plurality of die blocks each of a size so that it can be passed into a compartment, the die blocks being spaced apart, each die block being so shaped as to compress the material near the walls of each compartment with greater force than the material removed from said walls, and the retainer comprising an open frame freely admitting the die blocks and allowing material to pass into the spaces between the blocks.

15. In a molding apparatus, the combination with a mold having compartments, of a retainer for excess material supported on the mold, and a compressor comprising a plate having spaced openings therein, and a plurality of spaced die blocks adapted to pass into the retainer, each die block having a cavity communicating with one of said openings.

16. In molding apparatus, the combination with a mold having compartments, of a retainer for excess material supported on the mold, said retainer having a capacity at least equal to the mold, and a compressor comprising a plate having spaced openings therein, and a plurality of spaced die blocks adapted to be passed into the retainer, each die block having a cavity communicating with one of said openings, whereby excess material may pass into and through said cavities and openings and into the spaces between the blocks upon movement of the same into the retainer.

17. In molding apparatus, a mold, in combination with means for holding an excess of material above the mold comprising a framelike member having a pair of cross pieces and a pair of sides, the cross pieces being so shaped on their lower edges that the member seats upon the mold and is fitted to the same so that relative movement between the member and mold is prevented, the cross pieces being short of the ends of the member, and webs joining the cross pieces to the sides.

18. In molding apparatus, a mold, in combination with means for holding an excess of material above the mold comprising a framelike member having a pair of cross pieces and a pair of sides, the cross pieces being so shaped on their lower edges that the member seats upon the mold and is fitted to the same so that relative movement between the member and mold is prevented.

19. In molding apparatus, a compressor comprising a flat plate, a plurality of spaced slots provided at regular intervals in said plate, a plurality of rectangular die blocks secured upon one face of the plate and extending transversely in a row and spaced equal distances apart, each die block having a cavity extending therethrough and each cavity joining one of said slots, the length of the die blocks being less than the width of the plate.

20. In molding apparatus, a compressor comprising a flat plate, a plurality of spaced slots provided at regular intervals in said plate, a plurality of rectangular die blocks secured upon one face of the plate and extending transversely in a row and spaced equal distances apart, each die block having a cavity extending therethrough and each cavity joining one of said slots, each cavity being frusto-pyramidal in form and having four sides.

21. In molding apparatus, a compressor comprising a flat plate, a plurality of rectangular die blocks secured upon one face of the plate and extending transversely in a row and spaced equal distances apart, each die block having a cavity extending therethrough, each cavity being frusto-pyramidal in form and having four sides.

22. In a molding apparatus, the combination with a mold, of a retainer supported upon the top of the mold to hold an excess of material for the mold, a compressor having a die block with a cavity therein in its pressing face, said compressor entering the retainer and compressing the material therein which fills the cavity and forms a mound, and a second compressor for compressing the mound and forcing it into the mold.

23. In a molding machine, a base of a size to hold a mold thereon, a platform rising above said base and having a length equal to the length of the mold to be placed upon the base and a height above the base substantially that of the mold, clamping means mounted upon the base and adapted to engage one side of the mold and press the other side thereof against said platform, and means mounted upon the base for causing compression of the material within the mold when held in clamped position upon the base.

24. The process of molding bricks from brick-forming material, which consists in supplying a mold with an excess of the material, applying pressure to the excess material at the walls of the mold with greater force than to the material removed from the walls until the excess material has been compressed at the points near said walls substantially flush with the top of the mold, the excess material removed from the walls being shaped in the form of a mound which extends above the top of the mold, then applying pressure to the mound until all the material is substantially flush with the top of the mold, any excess material being removed therefrom.

25. The process of molding bricks from brick-forming material, which consists in filling the mold with the brick-forming material, then providing the mold with an excess of the material, retaining the excess material above the top of the mold, then compressing the material by applying the principal pressure at and adjacent to and along the walls of the mold, so that the excess material at those points is pressed down into the mold, the rest of the excess material remaining in a substantially loose state but assuming a mound shape extending above the top of the mold, then removing the compressor and applying other pressing means to the mound to force it into the mold until all the material is substantially flush with the top of the mold, and finally smoothing off the top of the mold and removing any excess material.

26. The process of molding bricks from brick forming material which consists in supplying a mold with an excess of material, simultaneously compressing a portion of the excess material and shaping the remaining portion in definite form, while at the same time relieving pressure on the portion which is being shaped, then finally compressing all the material.

27. The process of molding bricks from brick forming material which consists in supplying a mold with an excess of material, compressing portions of the material near the walls of the mold with greater force than the material removed from said walls while relieving pressure on said last-mentioned portion of material, then finally compressing all the material.

In testimony, that I claim the foregoing as my own, I have hereto affixed my signature.

WILLIAM H. HAWS.